United States Patent [19]

Harlow et al.

[11] Patent Number: 5,206,901
[45] Date of Patent: Apr. 27, 1993

[54] METHOD AND APPARATUS FOR ALERTING MULTIPLE TELEPHONES FOR AN INCOMING CALL

[75] Inventors: John B. Harlow, Middletown; Murthy Kolipakam, East Brunswick; Sankara R. Polepalle, Holmdel; Goerge Y. Wyatt, Howell, all of N.J.

[73] Assignee: AT&T Bell Laboratories, Murray Hill, N.J.

[21] Appl. No.: 812,787

[22] Filed: Dec. 23, 1991

[51] Int. Cl.[5] .................. H04M 3/42; H04M 7/00
[52] U.S. Cl. .................................. 379/211; 379/201; 379/205; 379/207; 379/219
[58] Field of Search ............. 379/156, 157, 158, 161, 379/201, 202, 207, 210, 211, 212, 221, 204, 205, 233, 184, 179, 195, 206, 219

[56] References Cited

U.S. PATENT DOCUMENTS

| | | | |
|---|---|---|---|
| 4,805,210 | 2/1989 | Griffith, Jr. | 379/184 X |
| 4,825,465 | 4/1989 | Ryan | 379/184 X |
| 4,953,203 | 8/1990 | Shepard | 379/207 |
| 5,023,868 | 6/1991 | Davidson et al. | 379/211 X |

FOREIGN PATENT DOCUMENTS 0039664 3/1982 Japan ..................... 379/205

OTHER PUBLICATIONS

Paul van Hal et al., "Service Script Interpreter, an Advanced Intelligent Network Platform", Ericsson Review, No. 1, 1990, pp. 12-22.

A. Batten, "Personal Communications Services and the Intelligent Network", British Telecommunications Engineering, vol. 9, Aug. 1990 pp. 88-91.

A. Barshefsky, et al., "The Evolution of Global Intelligent Network Architecture", *AT&T Technical Journal*, Summer 1991, pp. 11-25.

Alltel article "How the CallAnswer Package Manages Your Calls".

Primary Examiner—James L. Dwyer
Assistant Examiner—Harry S. Hong
Attorney, Agent, or Firm—Michael B. Johannesen

[57] ABSTRACT

A system for alerting a plurality of telephones in response to an incoming call to a destination directory number. A handling switch sends a query to a centralized database requesting routing instructions, and the database returns the directory numbers of the plurality of telephones to be alerted for incoming calls to the destination directory number. The busy/idle status of all of the plurality of telephones is checked, and an alerting signal is sent to all idle telephones. The handling switch is notified as to which alerted telephone has an off-hook appearance first, and the incoming call is routed to that telephone.

9 Claims, 3 Drawing Sheets

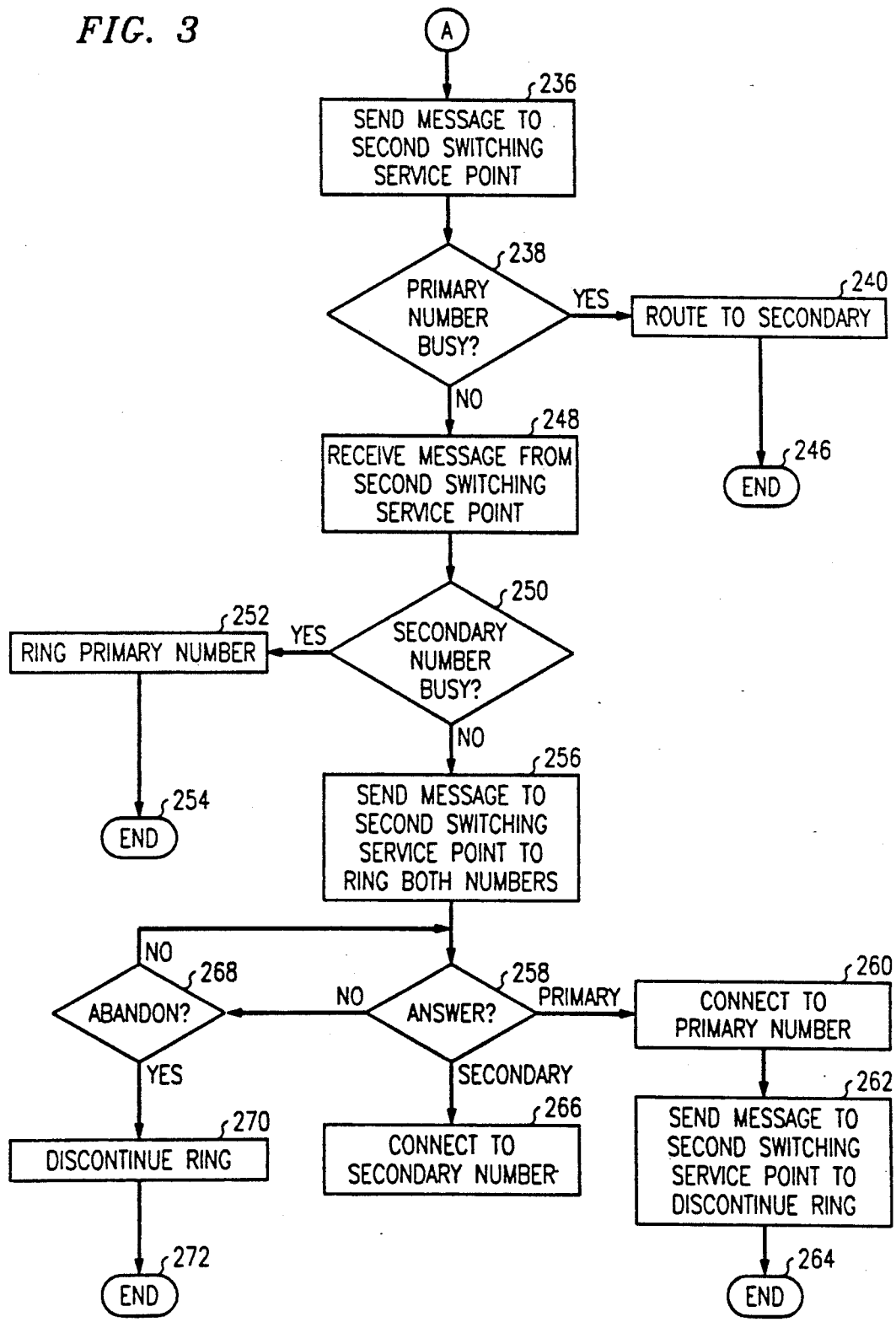

METHOD AND APPARATUS FOR ALERTING MULTIPLE TELEPHONES FOR AN INCOMING CALL

TECHNICAL FIELD

This invention relates to the field of local telephone switching systems, and more specifically to sending alerting to a plurality of telephones on different switching systems in response to an incoming telephone call.

BACKGROUND OF THE INVENTION

Being "in touch" has become increasingly important for some people, i.e., doctors, business executives, attorneys, etc., who have a strong need to be reached wherever they are. Many of these people have a telephone for business, a telephone for home, a mobile cellular telephone for the car and/or a transportable telephone that can be carried around when not near one of the other telephones. Additionally, some professionals have multiple offices with a telephone in each office. Some work at home in conjunction with an office at a business location for when they are "on premises", with at least one telephone at each location. All of these telephones generally have different telephone numbers and are frequently on different local offices with different prefixes. This requires the caller to know or look up multiple telephone numbers, and frequently to make multiple calls in order to reach a person.

While there are several telephone equipment features and telephone company services designed to ease the problem of multiple telephone numbers, they do not solve all the problems. For example, call forwarding provides call redirection from one telephone to another. However, once the subscriber activates call forwarding, he or she cannot answer the primary telephone until the feature is deactivated. Additionally, calls can only be forwarded to one telephone, so that the user must know where he or she is going to be in order to forward calls effectively. Without remote activation, subscribers must turn on call forwarding from their primary telephone.

A second attempt to solve this problem requires the addition of expensive customer premises equipment connected to the primary telephone and either a second telephone line or three-way calling. In this system, when a call comes in, the system sets up a three-way call to a pre-programmed telephone number, and either simultaneously alerts the attached telephone and the remote telephone or alerts the remote telephone after a predetermined number of rings. The system determines whether the attached telephone or the remote telephone answers first. If the attached telephone answers first, the system terminates the connection to the remote telephone. If the remote telephone answers first, the system bridges the incoming call to that telephone or, for three-way calling, simply drops off the connection. This system is limited in the number of other telephones that the may be alerted, and involves installing and programming customer premises equipment that occupies space at or near the customer's telephone, and requires an additional line or coordination with three-way calling.

Some central offices have the capability to alert two telephones in response to an incoming call, and terminate the incoming call to the first of the telephones from which an off-hook signal is detected. This system is limited in that both of the alerted telephones must be connected to the same central office.

Therefore, a problem in the art is that there is no low cost, network based solution to the problem of alerting a plurality of telephones connected to more than one central office for a single incoming call.

SUMMARY OF THE INVENTION

This problem is solved and a technical advance is achieved in the art by a method performed in a local switching system which, in response to an incoming call comprising a destination directory number, translates the directory number into one or more identifications of lines served by the local switching system, and one or more directory numbers not served by the local switching system, alerts the identified lines, places outgoing calls to the directory numbers, and terminates the incoming call to the line or lines from which answer is detected. Advantageously, translating the destination directory number comprises sending a message to a database shared by a plurality of local switching systems. The shared database returns the one or more directory numbers and the one or more line identifications.

A method in accordance with one embodiment of this invention provides alerting to multiple telephones in response to one incoming call implemented in an intelligent network comprising a plurality of switching service points interconnected by a plurality of communication links via a signaling transfer point and a plurality of voice and data trunks. A shared database is also connected to the signaling transfer point. A call is received at one of the switching service points, wherein the call comprises a directory number. The switching service point recognizes the directory number as a unique number requiring database action and sends a query to the shared database. The shared database returns routing numbers, which the switching service point translates, associated with primary and secondary telephones that are to be alerted for incoming calls to the directory number. The local switching system sends messages over the signaling channel to the identified local switching systems requesting busy/idle status of the lines associated with the primary and secondary directory numbers. The identified local switching systems return the requested information, and the local switching system requests, via a further message, that alerting be applied to the lines associated with the primary and secondary directory numbers if they are idle. When one of the lines reports off-hook, it is reported to the local switching system and the incoming call is routed over a trunk to the local switching system that reported the off-hook. The other call (or calls) is dropped.

In another embodiment, an incoming call is routed to a switching service point, wherein the switching service point comprises a local switching system that serves the primary number. The switching service point determines that the primary number requires database action, and sends a message to a shared database. The shared database returns the numbers of the secondary telephone or telephones to be alerted for incoming calls to the directory number. The switching service point checks its own busy/idle status table and sends a message to the local switching systems serving the secondary telephone(s) for busy/idle status. The switching service point applies alerting to the line associated with the primary directory number, and sends a message to the local switching system(s) to apply alerting to the lines associated with the secondary number(s), if idle. The switching service point connects the incoming call to its own line if off-hook is detected first, or connects the incoming call to the local switching system that reports off-hook first.

Another embodiment provides alerting of multiple telephones in response to an incoming call is implemented in a conventional local telephone system comprising a plurality of local switching systems interconnected by trunks. An incoming call is received at a local switch, which, during translation, determines that there is more than one telephone to alert. The line at the local switching office is alerted, and an outgoing call is placed to the other local switching office via a trunk. The local switching office connects the incoming call to the line if off-hook is detected first, or to the trunk if answer supervision is detected first.

BRIEF DESCRIPTION OF THE DRAWING

A more complete understanding of the invention may be obtained from a consideration of the following description in conjunction with the drawings, in which:

FIGS. 2 and 3 are flow charts of control of the actions at a switching service point in the intelligent network of FIG. 1.

DETAILED DESCRIPTION

Figure 1:
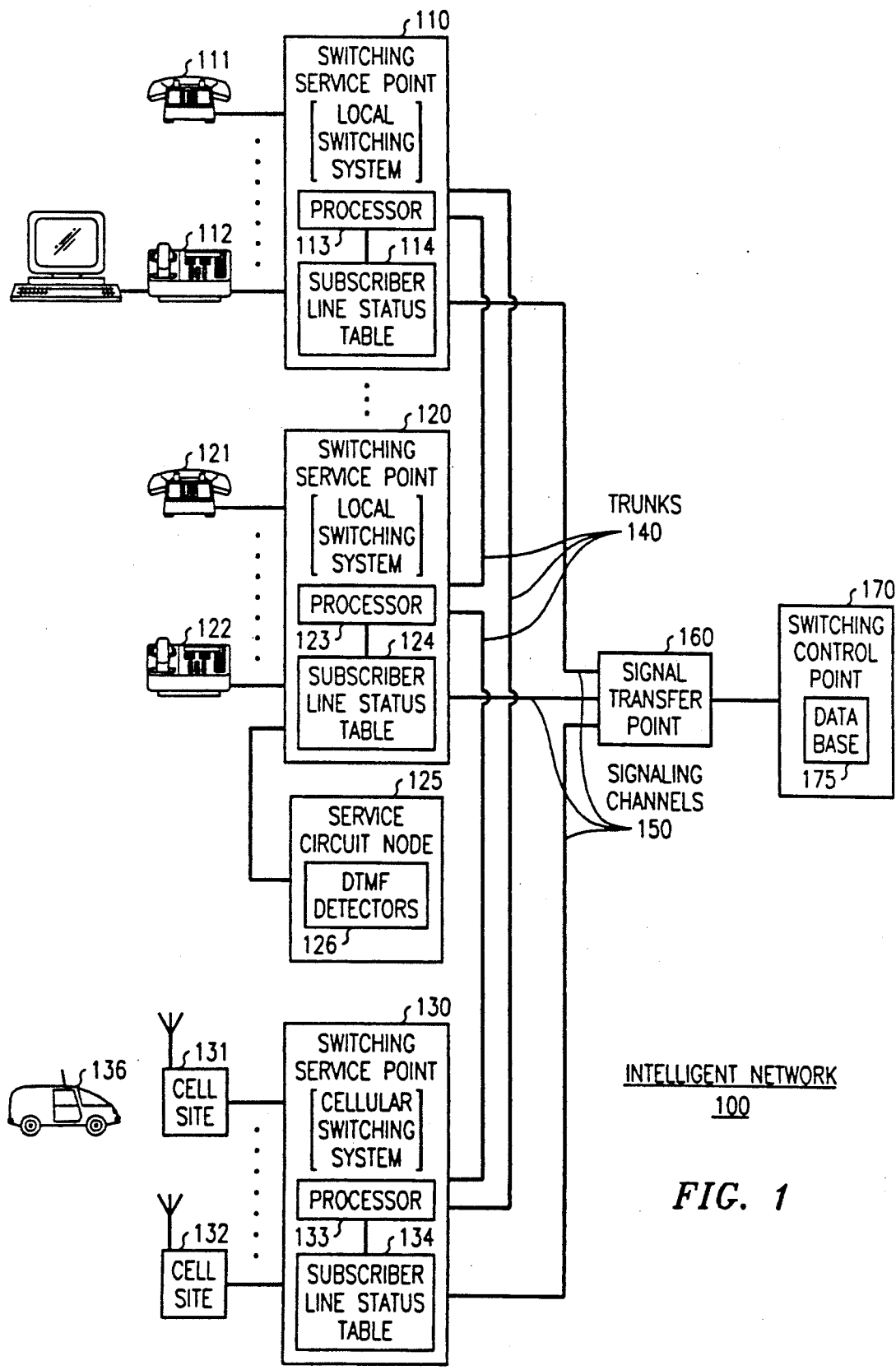
FIG. 1 is a block diagram of a switching network configuration including an exemplary embodiment of an intelligent network that can alert more than one destination for an incoming call.

FIG. 1 shows a simplified block diagram of a telecommunication system 100, wherein the exemplary method of this invention may be practiced. In this exemplary embodiment, telecommunication system 100 is an intelligent network, similar or identical to the intelligent network described in AT&T Technical Journal, Summer, 1991, pp. 11-25, which is incorporated herein by reference. Intelligent network 100 comprises, in this exemplary embodiment, a plurality of switching service points (SSPs) 110, 120, and 130. Three SSPs are shown in this example for clarity, but an operational intelligent network may comprise more SSPs.

SSP 110 is, in this exemplary embodiment, a distributed control, local digital switch, such as a 5ESS® switch as described in the AT&T Technical Journal, v. 64, no. 6, July/August 1985, pp. 1303-1564, the November, 1981 Bell Laboratories Record, p. 258, and the December, 1981 Bell Laboratories Record, p. 290, and manufactured by AT&T. Alternatively, SSP 110 may be a distributed control, analog or digital switch, such as an ISDN switching system as disclosed in U.S. Pat. No. 4,592,048, issued to M. W. Beckner et al., on May 27, 1986. SSP 110 is connected to a plurality of telephone station sets, such as dual-tone, multi-frequency (DTMF) telephone 111 and integrated services digital network (ISDN) telephone 112. ISDN telephone 112 may be connected to a personal computer, as is known in the art. SSP 110 is a stored program controlled system, under control of processor 113. Processor 113 maintains a subscriber line status table 114 of the on-hook, off-hook, or other state of all of the telephone station sets (such as 111, 112) connected to SSP 110.

SSP 120 comprises, in this exemplary embodiment, a 5ESS® local switch, similar or identical to SSP 110. A plurality of telephone station sets are connected to SSP 120, such as DTMF telephone 121 and ISDN telephone 122. SSP 120 is controlled by processor 123 which maintains a subscriber line status table 124. SSP 120 is also connected to a service circuit node (SCN) 125 which provides centralized services for SSP 120 and other SSPs in intelligent network 100. SCN 125 includes DTMF detectors 126.

SSP 130 comprises a cellular communications system in this exemplary embodiment, such as an AT&T Autoplex ® System 1000. Cellular communications system comprises a plurality of cells, for example, 131, 132 connected to a wireless communication system 130 via data links for message communication and communication path trunks. Wireless communication system 130 may be a central processing system, or may be a distributed processing system as described in Warty, et al., U.S. Pat. No. 4,827,299, issued May 2, 1989 to AT&T. Wireless communication system 130 includes a processor 133 and a status table 134 which records the status of mobile stations, such as mobile station 136, within the cellular communications system.

SSPs 110, 120, and 130 are interconnected by a plurality of trunks or channels 140 which provide voice and data communication paths between SSPs. SSPs 110, 120, and 130 are also interconnected by signaling channel 150. SSPs use signaling channel 150 to communicate with each other in setting up connections and providing special features. SSPs communicate on signaling channel 150 using Signaling System 7 (SS7) protocol in this exemplary embodiment, as is known in the art. Signaling channel 150 is connected to signal transfer point 160 (STP), which acts as a signaling switch to receive and forward messages among SSPs, and receives and forwards signaling as necessary to a switching control point 170 (SCP). SCP 170 provides a common data base 175 for use by all of the SSPs.

In this exemplary embodiment of this invention, a person at telephone 111 is calling a person whose office telephone is, for example, telephone 122. In this example, the person whose telephone is 122 is a sales person who subscribes to the feature which is embodied in this invention. Further, the sales person also has a mobile telephone 136. The user of telephone 111 dials a special directory number. In this embodiment, all switches, whether part of the intelligent network or not, recognize this number as receiving special call treatment, similarly to current treatment of "800" and "900" calls. Non-SSP switches route the call to an SSP, such as SSP 110. The actions at SSP 110 are identical whether the call originated on SSP 110 or was preliminarily routed to SSP 110. SSP 110 recognizes the special directory number during translation and sends a message on signaling channel 150 through STP 160 to SCP 170 requesting routing instructions. SCP 170 performs a database lookup in database 175 and returns primary and secondary destination telephone numbers to SSP 110.

SSP 110 then determines the busy/idle status of the primary and all secondary destination numbers. If the primary and alternate destination numbers are connected to SSP 110, SSP 110 checks subscriber line status table 114 for the busy/idle status of each line. If the lines are idle, then ringing is applied to each line.

If the subscribers are on different local switching systems, as is the case in this example, SSP 110 queries other SSPs, in this preferred embodiment, for the primary and secondary busy/idle status, using ISDN user part (ISUP) messages. In this instance, SSP 110 sends ISUP messages to SSP 120 and SSP 130, because the primary number is connected to SSP 120 and a secondary number (cellular mobile station set 136) is served by SSP 130. SSP 120 and SSP 130 perform table lookups in their subscriber line status tables, 124 and 134 respectively, and determine whether the lines corresponding to the primary and secondary destination numbers are busy or idle. SSP 120 and SSP 130 return the busy/idle status via signaling network 150 to SSP 110. If, as in this example, both primary and alternate destination numbers are idle, SSP 110 causes SSP 120 and SSP 130 to apply ringing to the primary and alternate destination numbers by sending another ISUP message.

If the primary and alternate destination numbers are on the same central office switch, such as SSP 110, SSP 110 checks for answered supervision. For subscribers to this feature on different central office switches, SSP 110 checks for an ISUP answer message from either SSP 120 or SSP 130. When an answer message is received, SSP 110 routes the call via trunks 140 to the SSP that sent the answer message. SSP 110 sends an ISUP message to the other SSP to discontinue ringing. Finally, SSP 110 updates automatic message accounting records to indicate that the call received dual ringing treatment.

In another exemplary embodiment of this invention after the user of telephone 111 dials a directory number, the call is first routed to the local switching system connected to the primary destination telephone number, as is known in the art. In this exemplary embodiment, SSP 110 routes the call via trunk 140 to SSP 120. SSP 120 recognizes the special directory number during translation, and sends a message on signaling channel 150 via STP 160 to SCP 170. SCP 170 performs a lookup in data base 175 and returns the secondary destination numbers through STP 160 to SSP 120. SSP 120 determines if all of the secondary telephone numbers are connected to SSP 120. If both the primary and secondary destination telephone numbers are connected to SSP 120, SSP 120 determines the busy/idle status in status table 125, and if both primary and secondary telephones are idle, rings both telephones.

If the secondary telephone is not connected to SSP 120, SSP 120 sends an ISUP message to the SSP which controls the secondary number, in this case SSP 130. SSP 130 checks the busy/idle status of the destination telephone, in this case mobile station 136, in status table 134, and returns the busy/idle status via signaling network 150 and STP 160. SSP 120 then causes idle telephone station set 122 to ring and sends an ISUP message via signaling network 150 to SSP 130 to cause ringing on cellular telephone 136.

If telephone station set 122 answers first, answer supervision is detected by SSP 120 and an ISUP message is sent to SSP 130 to cease ringing. If mobile station 136 answers first, SSP 130 sends an ISUP message 150 indicating answer and SSP 120 sets up the connection via trunks 140 to SSP 130 and ceases ringing telephone 122. SSP 110 updates automatic message accounting records to indicate that the call received dual ringing treatment. In this manner, telephone 111 may be billed for the portion of the call between SSP 110 and SSP 120, and telephone 122 may be billed for the portion of the call between SSP 120 and SSP 130.

It is also possible to implement this invention in a conventional telephone network. Assume that SSPs 110, 120 and 130 are conventional switching system local offices, such as 5ESS switching systems. The user of telephone 111 dials a directory number of telephone 122. The call is routed by local switching system 110 to local switching system 120 in the normal fashion, as is known in the art. Switching system 120 performs a translation, as is known in the art, to determine which line is associated with the incoming directory number. In this embodiment of this invention, switching system 120 determines that there is one line associated with the incoming directory number, the line to telephone 122, and there is also a telephone number of a telephone on a remote switch, such as the telephone number of cellular telephone 136. Local switching system 120 handles the telephone number of telephone 136 as if it were a new origination, and places an outgoing telephone call to cellular switching system 130 on one of the trunks 140.

Simultaneously, switching system 120 applies ringing to telephone 122 and monitors trunk 140 for answer supervision. Switching system 120 terminates the call to whichever telephone indicates off-hook first, either by connecting the call to telephone 122 and dropping the call to cellular telephone 136 or by connecting the call to trunk 140 and dropping the call to telephone 122. Switching system 120 updates AMA records to indicate that the call received special handling, and, when the call is connected to another switch, telephone 122 may be billed for the portion of the call between switching system 120 and cellular switching system 130.

Figure 2:
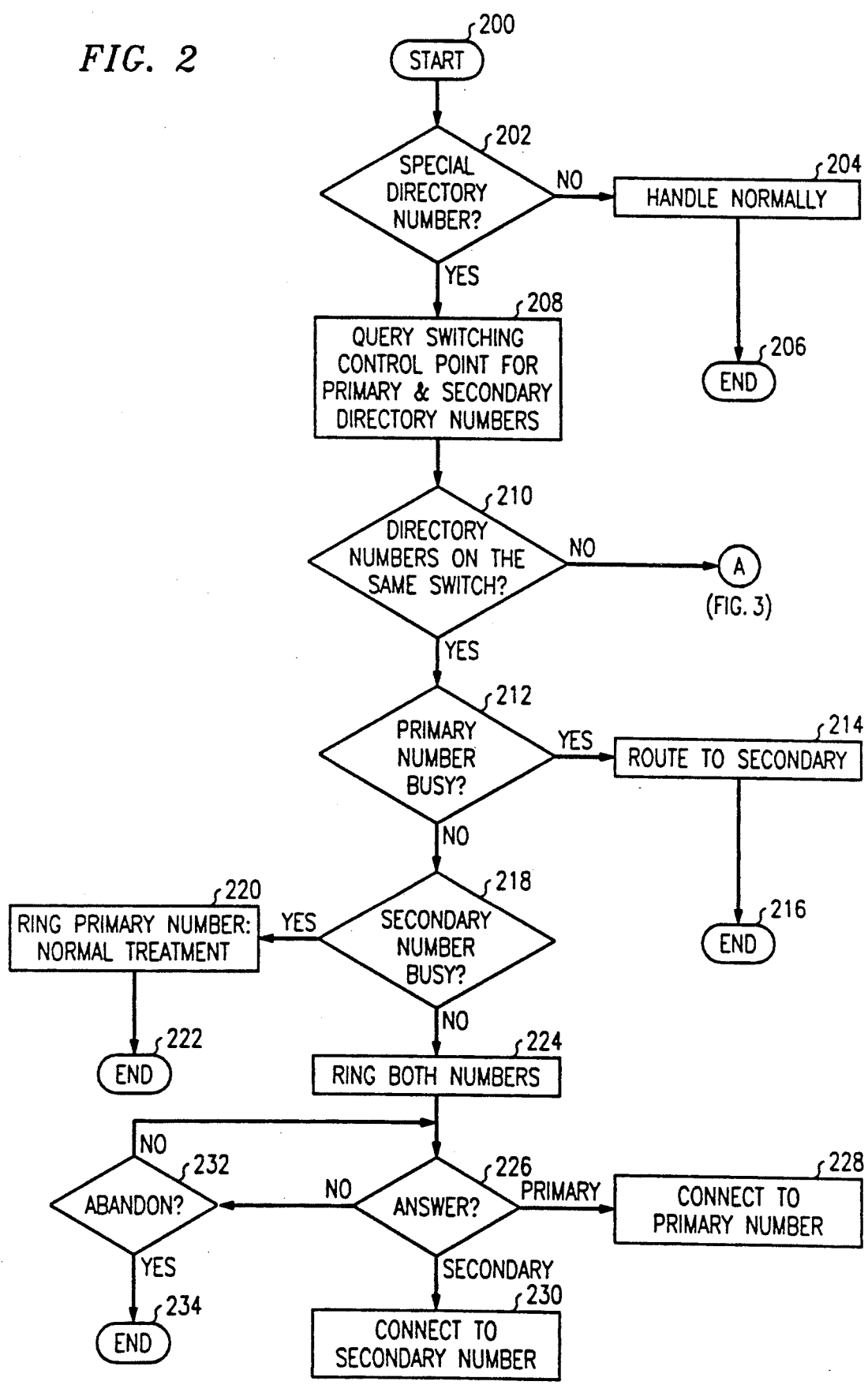

FIG. 2 is a flow chart describing the actions taken at SSP 110 for a dual ringing treatment of a call in the first exemplary embodiment of this invention, and SSP 120 for the second embodiment. In general, the first and second embodiments require similar actions at the SSPs, and the alternate actions are noted in the text. This example starts in block 200, where an incoming call is received, and proceeds to decision diamond 202 where a test is made if the directory number is one that receives dual ringing treatment. If the call does not receive dual ringing treatment, then in box 204 the call is handled normally and this branch ends in circle 206.

If in decision diamond 202 it was determined that the call receives dual ringing treatment, then a query is sent to the SCP for the primary and secondary destination numbers in box 208. If the call is processed by the SSP connected to the primary number, only the secondary number is required. Processing continues to decision diamond 210 where a message is received back from the SCP and a determination is made whether the destination numbers are on the same switch. If the destination numbers are not on the same switch, processing continues through connector A.

If the destination numbers are determined in decision diamond 210 to be on the same switch, a test is made in decision diamond 212 whether the primary number is busy. If the primary number is busy, processing proceeds to box 214, where the call is routed to a secondary number. In most circumstances, the secondary number will generally be a voice message system. This branch ends in circle 216.

If in decision diamond 212 the primary number is not busy, then the line status table is checked to determine whether the secondary number is busy. If the secondary number is determined to be busy in decision diamond 218, then in box 220 ringing is applied to only the primary number, and this branch ends in circle 222. This branch would be taken when, for example, another person is on the mobile cellular phone while the subscriber to this feature is at his or her desk.

If in decision diamond 218 the secondary number is busy, then processing continues to box 224 where ringing is applied to both telephones. Processing continues to decision diamond 226 where processing waits for receipt of answered supervision. If the primary phone answers in box 226, then the call is connected to the primary number in box 228 and processing ends. If in decision diamond 226 the secondary number answers first, then the call is connected to the secondary phone in box 230 and processing ends. If in decision diamond 226 there is no answer and the calling party abandons the call, then processing continues to box 232 where ringing is stopped and this branch ends at 234.

Turning now to FIG. 3, processing of calls where more than one SSP is shown. Continuing at connector A, processing continues to box 236 where a message is sent to the remote SSP. A determination is made in decision diamond 238 whether the primary number is busy. If the primary number is busy, then processing continues to box 240 where the call is routed to the secondary number. This branch ends in box 246.

If in decision diamond 238 the primary number is not busy, then processing continues to box 248 where a message is received from the secondary SSP. Processing continues to decision diamond 250 where a determination is made whether the secondary number is busy by looking at the message received in box 248. If the secondary number is busy in decision diamond 250, ringing is applied to only the primary phone in box 252 and this branch ends at 254.

If in decision diamond 250 the secondary number is determined not to be busy, then a message is sent to the remote SSP and ringing is applied to both telephones in box 256. Processing continues to decision diamond 258 where processing waits for either answer supervision at the primary SSP or alternatively an ISUP message sending an off-hook signal. If answer supervision is received then a connection is made to the primary phone in box 260 and a message is sent to the remote to discontinue ringing. This branch ends at 264.

If in decision diamond 258 a message is received from the secondary SSP that an off hook was received, then processing continues to box 266 where a path is completed to the secondary phone and ringing is removed from the primary If in decision diamond 258 it is determined that none of the lines have answered, then a test is made whether the call was abandoned in decision diamond 268. If the call had not been abandoned, then processing returns to decision diamond 258. If the call has been abandoned in decision diamond 268 then a message is sent to the secondary SSP in box 270 discontinuing ringing, and this branch ends in 272.

Updating the primary telephone number is a relatively trivial matter and is used, for example, when a business person changes offices temporarily (or permanently) from one location to another. A special telephone number is provided for this feature. The call is routed to service circuit node 125 (FIG. 1) to provide DTMF detection and recording of digits received via DTMF detectors 126. Alternatively, and SSP can provide digit collection and announcement playing by using the standard digit collection DTMF detectors and announcement capabilities. In the preferred embodiment, SCN 125 plays an announcement requesting the user to dial the primary telephone number, followed by a personal identification number. The subscriber enters the 7 or 10-digit primary telephone number, followed by, in the preferred embodiment, a three or four digit personal identification number. The service circuit node collects the digits, verifies the personal identification number and primary telephone number via an SCP inquiry, and plays an announcement. If the primary telephone number and the personal identification numbers are valid, SCN 125 prompts for the new destination number. After the user enters the new destination number, SCN 125 repeats the new destination number to the user, and requests verification. If the number is verified, then SCN 125 plays a confirmation tone or message, sends the updated destination number to SCP 170 to update database 175, and terminates the call. If the subscriber enters "no" then the service circuit node reprompts for the destination number. If the personal identification number and/or the primary telephone number is invalid, the service circuit node prompts the user to try again. If more than two invalid primary telephone numbers, personal identification numbers, are entered, the service circuit node informs the user to call a local service provider for assistance.

In this embodiment of this invention, the alternate telephone numbers are fixed, that is, they cannot be changed via the above scenario. However, one skilled in the art would see that it would be a trivial matter to adapt the above updated primary telephone number for the secondary telephone number. Optimally, the alternate number is, for example, an answering machine or secretary. A good candidate for a secondary number is also a voice messaging system which may allow the user to either leave a voice message or to forward a call to the secretary.

It is to be understood that the above-described embodiments are merely illustrative principles of the invention and that many variations may be devised by those skilled in the art without departing from the scope of the invention. For example, it would be a trivial matter to program a processor in a switch to apply ringing to a telephone for a period of time, five rings, for example, and then place a call to a second telephone number. This would be useful in situations where an elderly person is living alone at the primary number, and a relative or neighbor monitors the secondary telephone number. The relative would be alerted to those times when the elderly person did not answer the phone. Additionally, an incoming call may be bridged to both the primary and secondary telephones at the switching system, so that if the secondary telephone is answered first, the primary telephone may be answered for a predetermined time period afterwards. It is therefore intended that such variations be included within the scope of the following claims.

We claim:

1. A method for providing alerting signals at a plurality of telephones, said method comprising:

responsive to receiving an incoming call comprising a destination directory number at a local switching system, translating said destination directory number into one or more previously stored identifications of lines served by said local switching system and one or more previously stored directory numbers not served by said local switching system said identified lines and directory numbers being associated with said destination directory number;

alerting said one or more identified lines;

placing outgoing calls to said one or more directory numbers; and terminating said incoming call to said one or more identified lines and directory numbers from which an answer is detected.

2. A method in accordance with claim 1 wherein said translating said destination directory number comprises sending a message to a database shared by a plurality of local switching systems and in response said database returning said one or more directory numbers and data for said one more line identifications.

3. A method in accordance with claim 1 wherein said placing outgoing calls comprises sending messages to one or more other local switching systems handling said one more directory number, wherein said one or more other local switching systems apply ringing to each line corresponding to said one or more directory numbers.

4. A method in accordance with claim 3 wherein said terminating comprises:
   if answer is first detected on one of said one or more identified lines, connecting said incoming call to said one of said one or more identified lines; and
   if answer is first detected on one of said each line corresponding to said one or more directory numbers, said other local switching system where said answer is detected sending a message to said local switching system and said local switching system setting up a call path to said one of said each line in said other local switching system.

5. A method for providing alerting signals at a plurality of telephones, said method comprising:
   responsive to receiving an incoming call comprising a destination directory number at a local switching system, translating said destination directory number into one or more identifications of lines served by said local switching system and one or more directory numbers not served by said local switching system;
   alerting said one or more identified lines;
   placing outgoing calls to said one or more directory numbers;
   terminating said incoming call to said one or more identified lines and directory number from which an answer is detected; and
   ceasing alerting to the other lines where answer was not detected.

6. A method for providing alerting signals to a plurality of telephones responsive to one incoming call, said method comprising:
   receiving said call at a switching service point;
   said switching service point querying a database shared by a plurality of switching service points;
   said database sending said switching service point a primary and secondary destination telephone numbers in response to said query;
   said switching service point initiating calls to said primary and secondary destination telephone numbers, wherein at least one of said primary and said secondary destination telephone numbers are associated with a telephone connected to another switching service point; and
   terminating said incoming call to the first of said primary and secondary telephones from which answer is detected.

7. A switching system having a processor for providing alerting signals at a plurality of telephones, said switching system comprising:
   means responsive to an incoming call comprising a destination directory number for translating said destination directory number into one or more identifications of lines served by a first local switching system and one or more directory numbers not served by said first local switching system;
   means for alerting said one or more identified lines;
   means for placing outgoing calls to said one or more directory numbers;
   means for determining a first of said one or more identified lines and directory numbers from which answer is detected; and
   means for terminating said incoming call to said first of said one or more identified lines and directory numbers responsive to said determining means.

8. A switching system in accordance with claim 7 wherein said translating means comprises database means shared by a plurality of local switching systems.

9. A method for providing alerting signals at a plurality of telephones, said method comprising:
   responsive to receiving an incoming call comprising a destination directory number at a local switching system, translating said destination directory number into one or more identifications of lines served by said local switching system and one or more directory numbers not served by said local switching system;
   alerting said one or more identified lines;
   placing outgoing calls to said one or more directory numbers; and
   terminating said incoming call to a first of said one or more identified lines and directory number from which answer is detected.

* * * * *

UNITED STATES PATENT AND TRADEMARK OFFICE
CERTIFICATE OF CORRECTION

PATENT NO. : 5,206,901
DATED : April 27, 1993
INVENTOR(S) : J.B. Harlow et al

It is certified that error appears in the above-indentified patent and that said Letters Patent is hereby corrected as shown below:

Column 9, Claim 2, line 3, "one more" should be "one or more",

Column 9, Claim 3, line 8, "one more directory number" should be "one or more directory numbers".

Signed and Sealed this

Eighth Day of February, 1994

Attest:

BRUCE LEHMAN

Attesting Officer

Commissioner of Patents and Trademarks